United States Patent [19]

Sing

[11] Patent Number: 4,765,063
[45] Date of Patent: Aug. 23, 1988

[54] APPARATUS FOR PHOTOELECTRICALLY GENERATED PHYSICAL MEASUREMENTS

[76] Inventor: Peter Sing, 43 Donny Brook Rd., Scarsdale, N.Y. 10583

[21] Appl. No.: 1,228

[22] Filed: Jan. 6, 1987

Related U.S. Application Data

[63] Continuation-in-part of Ser. No. 882,144, Jul. 8, 1986, abandoned.

[51] Int. Cl.[4] .......................... G06M 3/14; G01B 3/12
[52] U.S. Cl. .................................... 33/140; 33/125 A
[58] Field of Search ................. 33/138, 139, 140, 126, 33/126.5, 126.6, 125 A, 125 B, 125 C; 73/170; 377/18; 43/6

[56] References Cited

U.S. PATENT DOCUMENTS

| | | | |
|---|---|---|---|
| 230,592 | 7/1880 | Williamson | 33/138 X |
| 2,676,411 | 4/1954 | Horch | 33/140 |
| 2,685,742 | 8/1954 | Johnson | 33/130 X |
| 2,930,584 | 3/1960 | Hensley et al. | 33/134 X |
| 3,102,525 | 9/1963 | Englis | 43/6 X |
| 3,229,517 | 1/1966 | Smith | 73/170 |
| 3,975,633 | 8/1976 | Larkin | 33/126.6 |
| 4,150,282 | 4/1979 | Aoki et al. | 33/139 |
| 4,242,574 | 12/1980 | Grant | 377/18 |
| 4,316,081 | 2/1982 | Washizuka et al. | 33/139 X |
| 4,395,630 | 7/1983 | Ramsden et al. | 33/140 X |
| 4,575,944 | 3/1986 | Lin | 33/139 X |

*Primary Examiner*—William D. Martin, Jr.
*Attorney, Agent, or Firm*—Nathaniel Altman

[57] ABSTRACT

A nylon or metal filament carrying uniformly spaced light-distinguishable scale markings is moved, in taking a measurement, between a light source and a photosensor which reads the scale markings directly and emits a single electrical pulse for each passing scale marking. The extent of movement of the filament corresponds to the magnitude of the physical measurement being taken. Pulses from the photosensor are received by a memory-chip-containing electronic processing counter or calculator for counting, storage calculation, conversion to appropriate measurement units, etc. and a final reading of the measurement taken appears on a digital display. For length measurements, the apparatus is provided with a storage reel for the filament and a reversing switch for rewinding or for reversing the counting element. A timing device, a spring-operated weighing scale, and a fluid-pressure-responsive member attached to the filament may be included in the apparatus to adapt it for measurements of weight, time, velocity, pressure, altitude and the like to be taken.

22 Claims, 4 Drawing Sheets

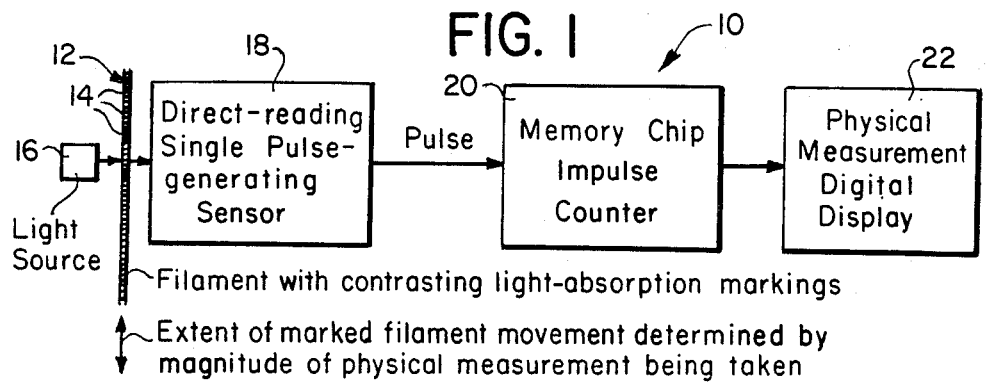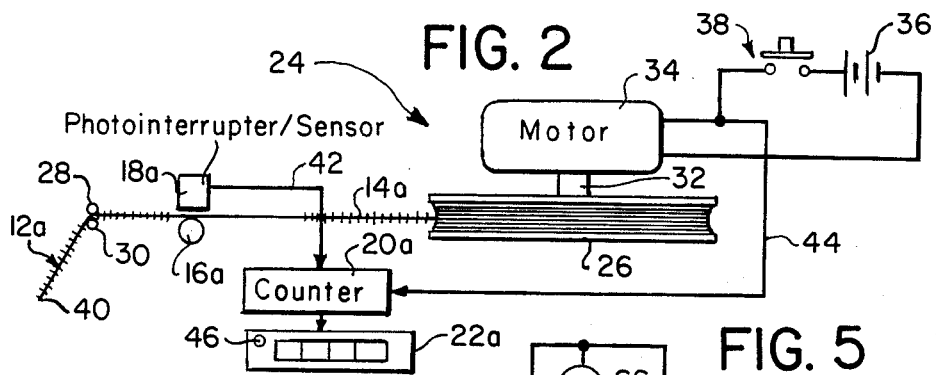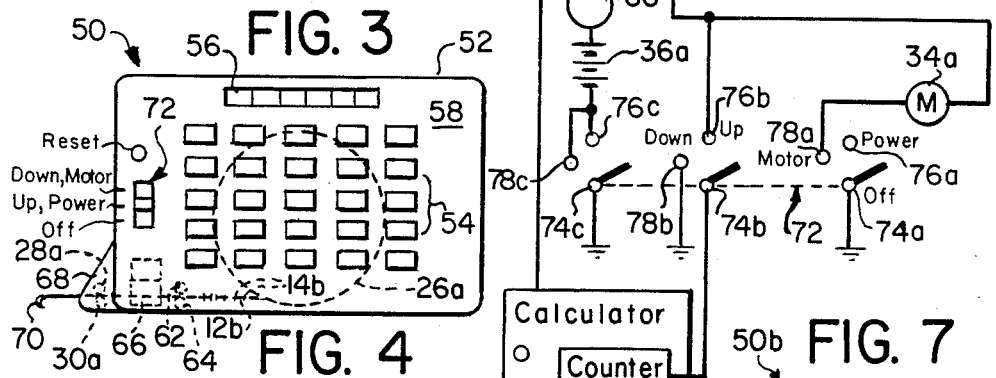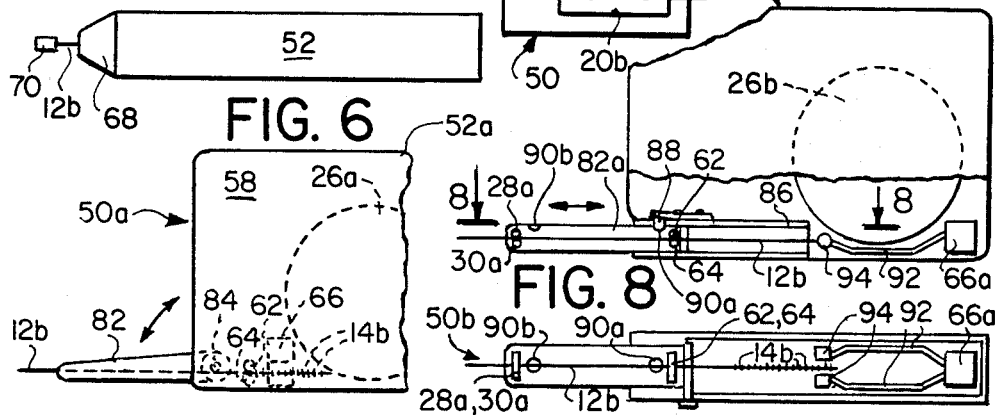

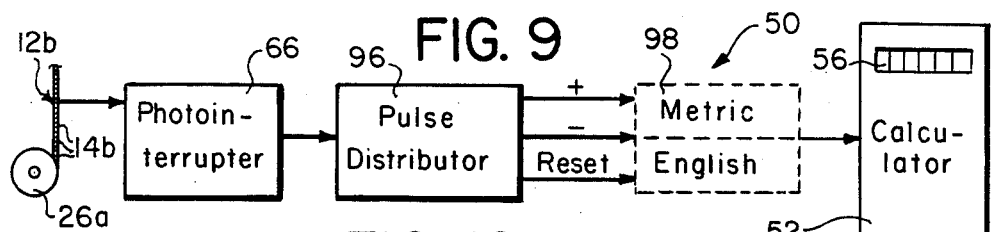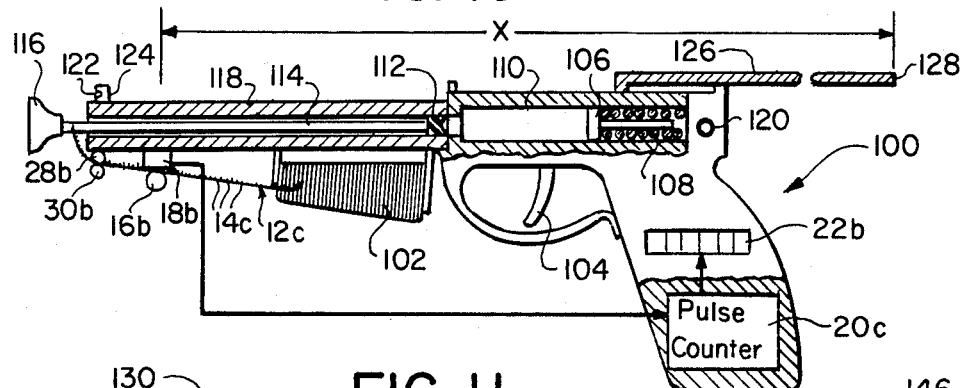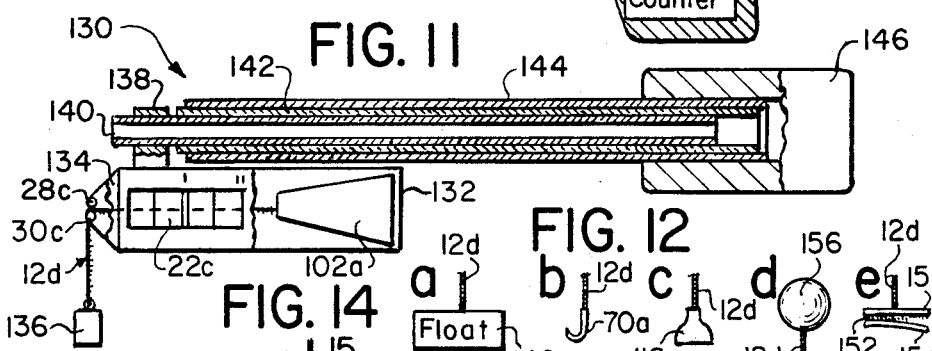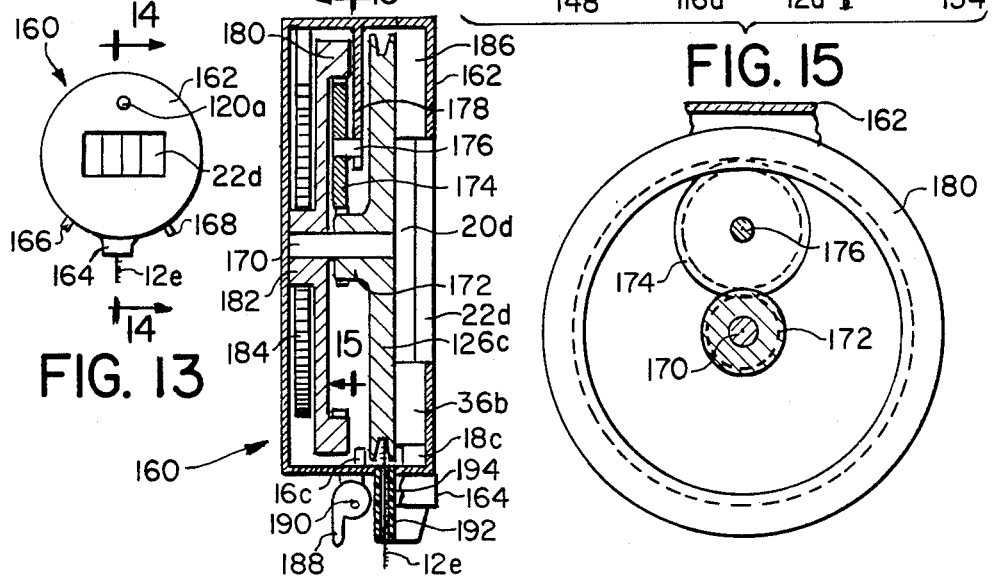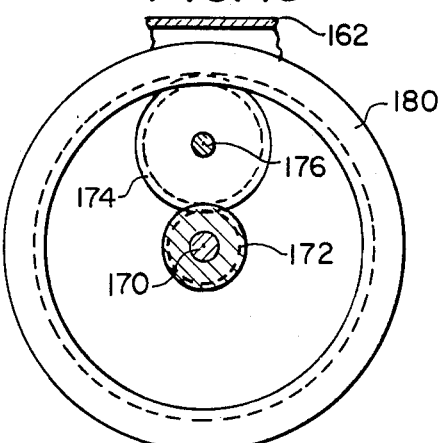

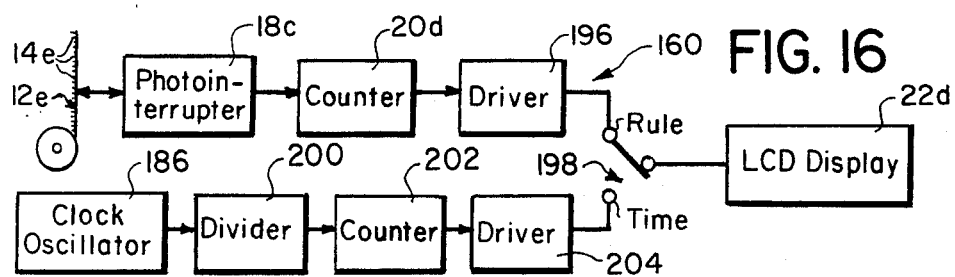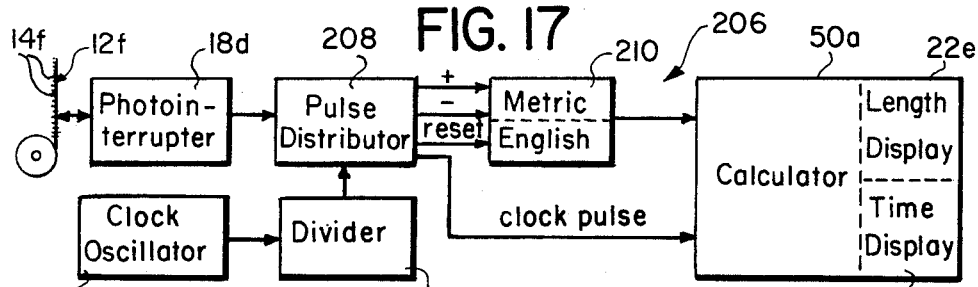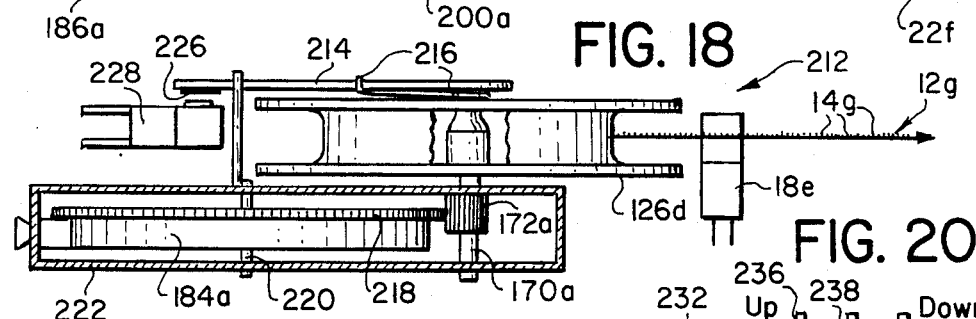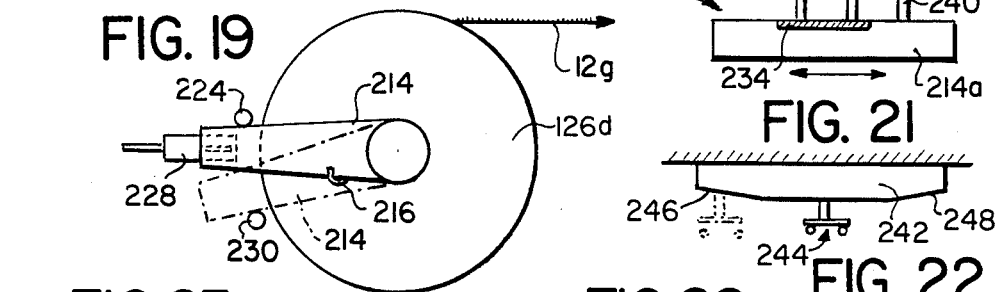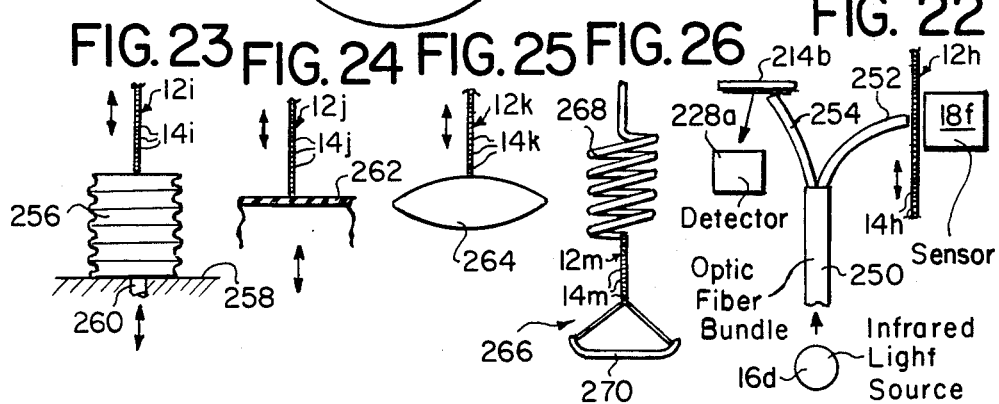

APPARATUS FOR PHOTOELECTRICALLY GENERATED PHYSICAL MEASUREMENTS

This application is a continuation-in-part of now abandoned application Ser. No. 882,144, filed July 8, 1986 and titled: "Distance Measuring Apparatus".

BACKGROUND OF THE INVENTION

This invention relates to instruments and systems for registering and displaying multiple physical measurements, especially length or distance determinations, but also including weight, time and such fluid-pressure-generated readings as those indicating pressure, altitude, speed, temperature and the like.

Conventional apparatus for taking physical measurements may be of limited accuracy, awkward to use, bulky, heavy, or all of these. In the case of length-measuring devices, rulers and yardsticks are inflexible and suitable for making easy measurements only of short lengths along straight lines and flat surfaces. Current tape measures, while capable of somewhat longer measurements, tend to be large and heavy because of their bulky housings and tape-return mechanisms, the latter being subject to wear and malfunction. Standard meters for indicating pressure, altitude, temperature, etc. generally depend on mechanical translation of the force being measured through non-uniformly-performing hair springs or the like, and are therefore of limited accuracy; they may also be relatively large, heavy, difficult to read, complicated, and/or expensive.

Accordingly, it is a primary object of the present invention to provide improved apparatus for making and displaying various physical measurements without mechanical connections.

It is a further object of this invention to provide an apparatus which registers, displays, and even retains any one of, or any combination of, such physical measurements as length, weight, time, velocity and such fluid-pressure-controlled factors as pressure and altitude.

It is a still further object of the invention to provide measuring apparatus of relatively small size and weight, yet of greatly increased capacity and accuracy as well as low cost when compared to currently available devices.

These and other objects of the present invention will be described in detail in the following sections of this specification.

SUMMARY OF THE INVENTION

In accordance with the present invention, a thin synthetic fiber or metal filament, carrying a measuring scale comprising evenly spaced marks of a light-absorbing character opposite to, and optically distinguishable from, that of the filament, is moved between a light source and a single direct-reading pulse-generating sensor. Each evenly spaced mark in passing causes the sensor to generate an individual pulse which passes to, and is counted by, a memory chip impulse counter, then is driven to a digital display where the magnitude of the scale's movement in units corresponding to the desired measurement is shown. Switching means are provided to reverse the counter when the filament is moved mechanically in the opposite direction and retracted.

The elements of a conventional electronic calculator may be combined with the measuring apparatus of this invention, replacing the impulse counter and display, and retaining the conventional calculator functions and adding those of the measuring device. In its simplest form, the combination calculator-measuring device can be used, as a tape measure is for determining length or distance only. Alternately, by adding selective attachment elements such as a spring balance, fluid-pressure-responsive bellows or the like to the end of the scale-marked filament, various other physical measurements may be made. Each of these attachments can be joined at will with an end of the filament to control its movement past the sensor of the combination calculator-measuring device, and thus direct accurate readings of weight, pressure, altitude, etc. may be achieved in the appropriate units of each measurement supplied by conversion constants stored in the calculator's memory chip.

Additionally, a timing mechanism, including stopwatch capacity, may be incorporated in the calculator-measuring device by sending pulses from the timer through the counter and display of the device. Thus, with the calculator registering both distance and elapsed time, velocity measurements as well as time may be taken and displayed. A multi-functional measuring apparatus with calculator capability is thereby achieved.

The scale-marked filament of this invention is preferably nylon thread less than 1 mm. in diameter, so fine that, combined with miniaturized light source, sensor and storage reel, relatively great lengths of filament for long distance measurements may be provided in the measuring apparatus without adding significantly to the size and weight of a conventional pocket electronic calculator.

These concepts and illustrative examples of the best mode now contemplated for practising the present invention will be discussed hereinafter in detail in connection with the accompanying drawings, wherein:

BRIEF DESCRIPTION OF THE DRAWINGS

FIG. 1 is a diagrammatic representation of the basic concepts of this invention;

FIG. 2 is a schematic view of a length-measuring device constructed in accordance with this invention;

FIG. 3 is a front elevational view of a length-measuring device incorporated in and combined with an electronic calculator of a conventional type;

FIG. 4 is a top plan view of the device of FIG. 3;

FIG. 5 is a circuit diagram of the device of FIG. 3;

FIG. 6 is a fragmentary front elevational view of a modified form of the device of FIG. 3;

FIG. 7 is a front elevational view, partially broken away, of another modified form of the device of FIG. 3;

FIG. 8 is a sectional view taken along line 8—8 of FIG. 7;

FIG. 9 is a block diagram corresponding to the length-measuring devices of FIGS. 3-8;

FIG. 10 is a side elevational view partly in section of another embodiment of a length-measuring device of this invention;

FIG. 11 is a side elevational view partly in section of still another embodiment of a length-measuring device;

FIGS. 12a-e illustrates examples of various end elements to be attached to any of the length-measuring devices herein described;

FIG. 13 is a front elevational view of a length-measuring device incorporated in and combined with a timing device;

FIG. 14 is a sectional view taken along line 14—14 of FIG. 13;

FIG. 15 is a sectional view taken along line 15—15 of FIG. 14;

FIG. 16 is a block diagram describing the combination device of FIGS. 13-15;

FIG. 17 is a block diagram describing an embodiment of this invention which combines a length-measuring device, a timer, and a calculator of the conventional type;

FIG. 18 is a bottom plan view partly in section of a length-measuring device having a switch mechanism for reversing its measurement counter;

FIG. 19 is a front elevational view of FIG. 18;

FIG. 20 is a detail view of another switch mechanism;

FIG. 21 is a detail view of still another switch mechanism;

FIG. 22 is a schematic view of a light-transmitting system for use in the practice of this invention;

FIG. 23 is a schematic view of a bellows for use in fluid-pressure-sensitive measurements in accordance with this invention;

FIG. 24 is a schematic view of a diaphragm for use in fluid-pressure-responsive measuring instruments;

FIG. 25 is a schematic view of a bladder for use in fluid-pressure-responsive measuring instruments;

FIG. 26 is a schematic view of a spring scale device for use with any of the length-measuring devices herein described to determine the weight of small objects.

DESCRIPTION OF THE PREFERRED EMBODIMENTS

Figure 27:
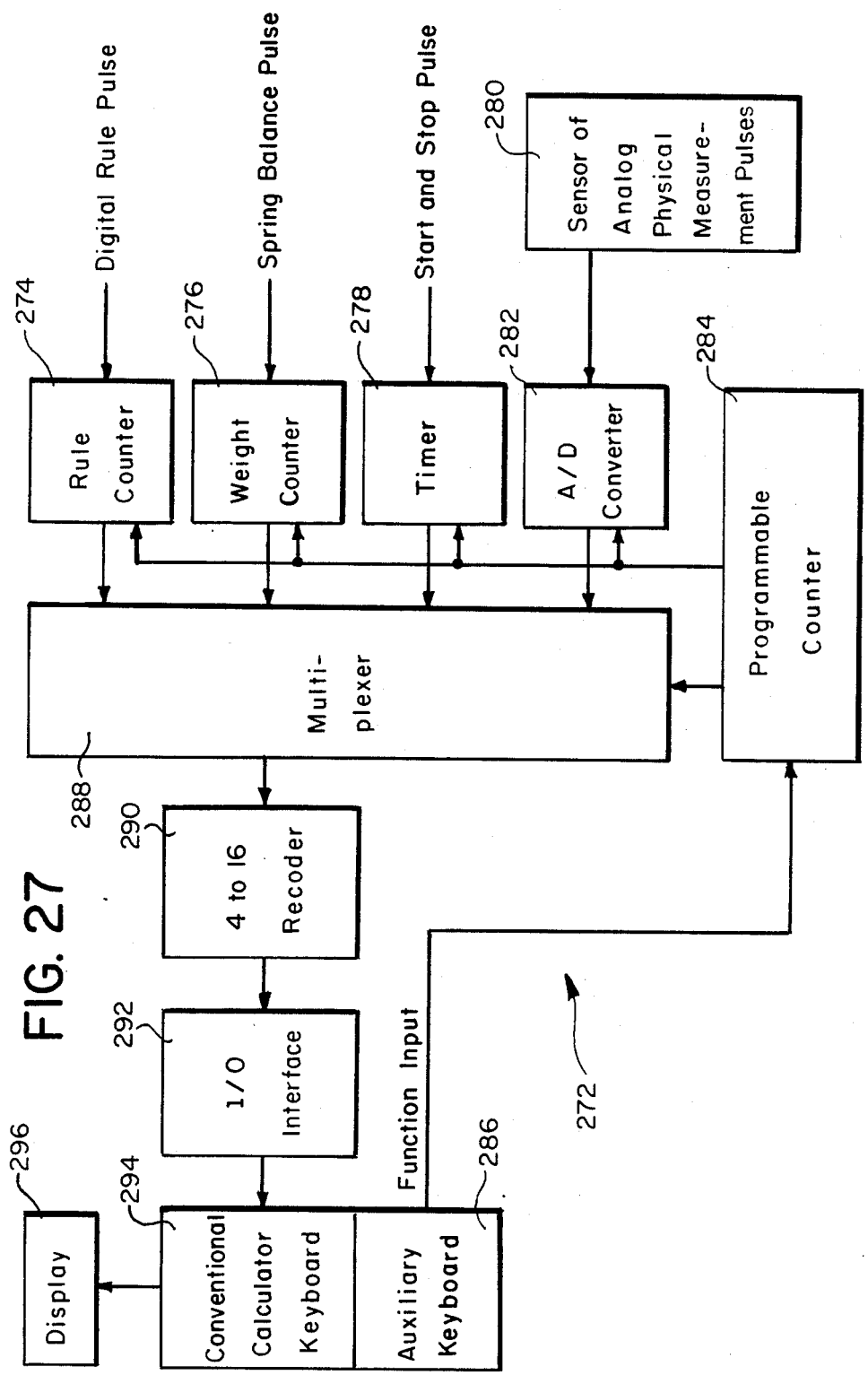
FIG. 27 is a block diagram of a multi-function instrument combining the conventional functions of a calculator with the operations of digitally displayed length-measuring rule, weight-meassuring scale, timer and stop-watch, and fluid-pressure-responsive measuring device all in one unit.

FIG. 1 illustrates diagrammatically the operation of a preferred embodiment of this invention generally designated 10, wherein filament 12 carrying light-sensitive evenly spaced markings 14 may be moved in either direction along a path substantially perpendicular to the rays of light emanating from light source 16. Scale markings 14, as they are moved past last source 16, actuate direct-reading sensor 18 to generate individual pulses corresponding to, and quantitatively descriptive of, the measurement being taken; these pulses are passed on to memory chip impulse counter 20, and the resulting count is made to appear on digital display 22 in appropriate measurement units.

In FIG. 2, a length-measuring device 24 is shown schematically having filament 12a with scale markings 14a thereon; filament 12a may be unwound manually from reel 26, passing between light source 16a and photo-interrupter/sensor 18a, then through guide rollers 28,30. Reel 26 is mounted on shaft 32 for free rotation in the of unwinding filament 12a; in the opposite rewinding direction, both shaft 32 and reel 26 are rotated by motor 34, actuated when connected to power source 36 by the closing of switch 38. To use length-measuring device 24, the free end 40 of filament 12a may be held or temporarily fastened to a surface or object to be measured; device 24 is then pulled in the direction of measurement, permitting filament 12a to be unwound until the full distance being measured has been reached. During this unwinding, scale marks 14a have been drawn past and energized sensor 18a to transmit corresponding individual pulses through line 42 to counter 20a, which causes the resulting count to appear on display 22a in appropriate units. Rewinding filament 12a is accomplished by closing switch 38, which starts motor 34 and at the same time signals counter 20a through line 44 to reverse direction and count downward, permitting measurements to be made during the rewind cycle. Display 22a is provided with zero reset 46.

Filaments 12 and 12a, as well as those filaments described hereinafter, are made either of synthetic fiber or of metal, with a diameter of 0.1 inches (2.5 mm.) or less, the preferred form being a nylon strand with a diameter in the range of 0.025 inches (0.6 mm.) or less, of a type characterized by dimensional stability. High flexibility and the lowest possible resiliency for best accuracy in measurements are required. The thinness of the filaments used keeps the size and weight of the length-measuring devices of this invention to a minimum, despite filament lengths of a magnitude to allow measurements of dozens of feet or more to be made. Moreover, because of the flexibility of the thin filaments, they may be wrapped around objects of irregular shape for accurate contour length measurements, or even used for map-reading by extending the measuring filament along a zig-zag route to determine distances.

FIGS. 3, 4 and 5 disclose the length-measuring elements of this invention incorporated in, and combined with, an electronic calculator to form device 50, the housing 52 of which carries conventional keyboard 54 and digital display 56 on its front face 58. Operatively positioned within housing 52 is storage reel 26a, carrying filament 12b; filament 12b is led from reel 26a through guide rolls 62,64 and past a combination light source and sensor 66 in the form of an infrared emitter and detector, which provides a concentrated light beam and consequent generation of light-induced pulses of very high clarity. In the zero starting position of device 50, scale markings 14b on filament 12b are positioned to start at light-sensor 66, with the forward "lead" end of filament 12b unmarked as it leads through guide rollers 28a,30a, which are mounted in housing extension 68, and ends in this embodiment with combination hook-stop element 70.

A three-pole-double-throw switch 72 is mounted on front face 58 of housing 52; as best seen in FIG. 5, which shows switch 72 in the off, or rest position, to activate device 50, switch 72 is moved so that poles 74a, 74b and 74c rest on contacts 76a, 76b and 76c respectively. In this configuration, counter 20b of device 50 is powered by the closed circuit with power source 36a to count in the forward or up direction. The withdrawal of filament 12b from reel 26a past the energized light-sensor 66 in taking a measurement causes the passing scale markings 14b to create corresponding individual pulses to be counted and their total in appropriate units to appear on display 56. In order to retract filament 12b and restore device 50 to its starting position, or to make a count-down measurement, switch 72 is pushed to the position where poles 76a,b, and c rest on contacts 78a,b, and c respectively, so that motor 34a is energized to turn reel 26a and rewind filament 12b, at the same time reversing the direction of counter 20a. Switch 72 may be returned to its original off position at any time during the rewinding cycle to take an interim reading of descending counter display 56, if desired; alternatively, switch 72 may be kept in the rewind position until filament 12b is completely rewound.

The length-measuring calculator 50a of FIG. 6 differs from device 50 by the replacement of fixed housing extension 68 on unit 50 with retractable arm 82 pivoted at 84 in housing 52a of unit 50a; arm 82 may be extended outwardly in use, as shown, or may be pivoted to be held within the profile of housing 52a when stored.

Analagous to device 50a of FIG. 6, the length-measuring calculator 50b of FIGS. 7 and 8 has extension arm 82a, which is reciprocally slidable in guide 86 and capable of being held in either its extended position, as shown, or in retracted position, by detent 88 cooperating respectively with detent-holding depressions 90a or 90b. Also shown in FIGS. 7 and 8 is light-sensor 66a, conveniently positioned out of the path of filament 12b, but with a pair of fiber optic bundles 92 to carry light beams to, and return pulse signals from, a pair of emitters-receptors 94 operatively placed to count scale markings 14b as they pass.

FIG. 9 is a block diagram describing the operation of device 50 of FIGS. 3–5, but is applicable as well to the embodiments of FIGS. 6–8. Filament 12b is drawn off reel 26a to pass in operative juxtaposition to photointerrupter, or light-sensor, 66, which "reads" scale markings 14b, generates corresponding pulse signals and delivers these signals to pulse distributor 96. Optionally, the pulses may be sent through converter 98 and passed into calculator counter 20b. Since scale markings may be spaced on filament 12b in either English or metric units, converter 98 permits device 50 to convert English readings from filament 12b to metric, or vice-versa; thus only one single set of scale markings is required for each device 50.

An alternate embodiment of a length-measuring device in accordance with this invention is illustrated in FIG. 10, adapted to make relatively long distance measurements. Spring gun unit 100 has filament 12c stored on a reel or spool 12 (preferably conical) which may be a miniature version of those used for thread in the garment industry to allow the thread to be removed therefrom at high speeds.

Spool 102 is mounted on spring gun 100, which has trigger 104 for releasing piston 106, permitting it to be moved rapidly to the left as shown in FIG. 10 by the action of spring 108 in cylinder 110. The displaced air in cylinder 110 causes slight deformation of rubber member 112 affixed to projectile 114, which in turn causes projectile 114 to be ejected at high speed from the left end of gun 100.

Projectile 114 may be a dart having a head in the form of suction cup 116 of the type well known in toy guns used by children. Cup 116 should have considerable mass to facilitate straight-line motion of projectile 114 after it leaves gun 100. The free end of filament 12c is connected to projectile 114 proximate cup 116 at a point outside gun barrel 118. When projectile 114 is ejected from gun 100, successive portions of filament 12c are pulled past guide rollers 28b,30b and between light source 16b and detector-sensor 18b. Pulses from sensor 18b generated by the passing of scale marking 14c of filament 12c are fed to a memory-chip-containing impulse counter 20c which counts the pulses and supplies the total to digital distance display 22b. The memory chip of counter 20c may have successive memory locations filled with data as pulses from sensor 18b are received; the memory locations may be reset to "0" logic levels, and display 22b returned to zero, by pressing reset button 120 on gun 100.

Normally, filament 12c will not be re-used in this embodiment. When trigger 104 is pulled after pressing reset button 120, projectile 114 pulls a length of filament 12c past sensor 18b. Suction cup 116 will either engage a surface the distance to which is being measured, or will fall to the ground at some distance from gun 100. In either event, the length of filament 12c which will have passed sensor 18b will appear on display 22b. Filament 12c then may be cut off by engaging it in cutting notch 122 positioned in gunsight 124 on gun barrel 118. A new projectile 114 may be loaded into gun 100, and the free end of filament 12c affixed to the new projectile; with impulse counter 20c reset, gun 100 is ready for another measurement.

Gun 100 may have attached thereto a rigid member 126, extending rearwardly and parallelly to the longitudinal axis of gun barrel 118 for a predetermined length, thus defining fixed distance X, between pulse-generating sensor 18b and the rearward end 128 of member 126. When a measurement of distance from an object or wall is to be made, end 128 of member 126 is placed against said object or wall and trigger 104 is then pulled to make a measurement. The actual distance to the "target" will be the sum of the distance appearing on digital display 22b and distance X, which may be selected conveniently to be exactly one foot, for example, thereby simplifying the calculation of the total distance.

Referring to FIG. 11, the principal operative components of length-measuring device 130 are contained in housing 132, which is preferably tapered at its front end 134 to a rather small dimension, in the range of 0.25 inch or less. A pair of rollers 28c,30c guide filament 12d as it emerges from housing 132. A weight 136, heavy enough when released to pull filament 12d from spool 102a, is attached to the front end of filament 12d. Appropriate light-sensor and electronic counter elements (not shown) are positioned in housung 132 behind, and provide length readings on, digital display 22c to generate pulse signals, count and display the filament length as it is removed from spool 102a in housing 132. The tapering of front end 134 of housing 132 permits it to be inserted into sall crevices or corners to allow accurate measurement of the distance from a surface thereof with respect to the ultimate location of weight 136. With device 130 having weight 136 in place, downward distances may be measured readily; for example, the distance down from a height, bridge or cliff may be determined, and if bridge or cliff overlook a body of water, the depth of water to the bottom may also be registered. Weight 82 may take the form of any projectile such as an arrow, bullet, or rocket; alternatively an attachment means such as a hook (not shown in FIG. 11) may be provided on the end of filament 12d for attachment to one of the above-mentioned projectiles, It is convenient for housing 132 to have affixed thereto bracket 138 which carries an elongate tube 140, slidably mounted in second tube 142, which in turn is slidably mounted in third tube 144. The end of tube 144 remote from bracket 138 is press-fitted into handle member 146, which may be grasped by the user of device 130 and manipulated to place housing 132 conveniently in hard-to-reach locations from which distance measurements are to be taken. Tubes 140, 142 and 144 may have appropriate end projections (not shown), of a type well known in the art, to permit telescoping, but to prevent the tubes becoming disengaged from one another. A scale (not shown) may be provided on each tube 140, 142 and 144 to afford a measurement of the total length of extension or telescoping for adding to, or subtracting from, the reading on display 22c, in order to establish an accurate net measurement.

The end elements depicted in FIGS. 12a-e may be used selectively to replace weight 136 in FIG. 11, or they may be individually affixed to a free end of any filament 12, 12a-d, for various purposes. Thus, FIG. 12a shows a float 148, attached at one end of filament 12d; float 148 may be placed in a stream or river, and the distance of travel from housing 132 determined. If the time of travel is also measured (independently with respect to FIGS. 11 and 12, but directly combined with length measurement in following embodiments), the velocity of flow of the river may be established. Alternatively, the speed of a boat or ship with respect to a body of water on which the vessel is traveling can be determined.

FIGS. 12b, c and e illustrate temporary attachment means for securing the end of filament 12d to an object or surface from which a measurement is to be taken. FIG. 12b shows a hook 70a, similar to hook 70 of FIGS. 3 and 4; FIG. 12c shows a suction cup 116a like end cup 116 of FIG. 10. In FIG. 12e, a small flat plastic patch 150 of any convenient shape carries, on the surface opposite to its attachment to filament 12d, a leyer of pressure-sensitive adhesive 152, covered with protective peel-away sheet 154. On removing sheet 154, one may attach patch 150 to a surface from which a measurement is to be taken. Each of these temporary attachment means 70a, 116a and 150 allows the user of any of the length-measuring devices herein described to measure distances far beyond his own reach without assistance.

Balloon attachment 156 of FIG. 12d may be used conveniently without ladders, etc. for taking vertical measurements beyond normal reach of, for example, the height of ceilings, buildings, trees and the like.

The measuring device 160 described in FIGS. 13–16 has its length-measuring capacity combined with timing and stop-watch capabilities, and, at the same time, comprises a filament return mechanism alternative to the motorized systems Of FIGS. 2–8. Specifically, device 160 has housing 162 with digital display 22d as well as reset button 120a on its front face, housing extension 164 at its lower end, and switch controls 166 for length display and 168 for time display to control selectively what appears on display 22d. As shown in FIG. 15, housing 162 encloses a return mechanism which comprises reel 126c for storing filament 12e; reel 126c is removably mounted on, and for rotation with, shaft 170, which is rotatably journalled in housing 162. Reel 126c may be removed and replaced by a fresh reel wound with new filament, when the original filament has been cut off instead of being rewound. Reel 126c carries a reel gear integrally formed therewith; the teeth of gear 172 mesh with the teeth of intermediate gear 174, mounted for free rotation on stub shaft 176, which is positioned axially parallel to shaft 170 and journalled in internal extension 178 of housing 162. Gear 174 operatively engages planetary gear 180, the hub 182 of which is carried by shaft 170 for rotation therewith; coil spring 184 is carried on, and is attached at one end to hub 182; the opposite end of spring 184 is fixed to frame 162.

Gears 172, 174 and 180 together act as a reduction drive. For several turns of reel 126c (and gear 172), there is only one turn of planetary gear 180. Thus, as filament 12e is unwound from reel 126c and causes it to rotate, the number of turns of spring-carrying gear 180 is related to the length of filament removed by the following equation:

$$L = 2\pi R_2 \cdot (R_1/r_2) \cdot n$$

where:
L = length of filament removed from reel 126c
$R_2$ = radius of reel 126c
$R_1$ = radius of gear 180
$r_2$ = radius of gear 172
n = number of turns of gear 180.

Thus, depending on the gear diameters selected, a relatively short coil spring 184 may be used to retract and rewind a long filament length originally wound on reel 126c. When filament 12c rotates reel 126c as it is being removed therefrom, coil spring is wound more tightly and energy is stored therein; when filament 12e is released, coil spring 184 unwinds, causing the reduction drive gears to rotate reel 126c in the direction for filament 12e to be rewound thereon.

Housing 162 also contains light source 16c, sensor 18c, impulse counter 20d, clock oscillator mechanism 186 and power source 36b in the form of a battery to power the foregoing components.

An eccentrically mounted clamping member 188 is rotatable on shaft 190 fixedly mounted on lower housing extension 164. Filament 12e passes through resilient plastic tube 192 extending downwardly from frame 162 and exits therefrom. Clockwise rotation of clamp 188 collapses tube 190 against housing extension 164, thereby clamping filament 12e in place. Counterclockwise rotation of clamp 188 thereafter releases filament 12e which is then returned onto reel 126c by the action of coil spring 184. Housing extension 164 may have recess 194 positioned thereon to facilitate operation of the clamping mechanism.

FIG. 16 shows in block diagrammatic form the operation of device 160 wherein scale markings 14e on filament 12e unwinding from reel 126c are detected by photointerrupter-sensor 18c, and corresponding pulses are sent to impulse counter 20d and then transmitted to digital display 22d by driver 196 through selector switch 198 (operated by switch controls 166,168 of FIG. 13). In parallel manner, pulses from clock oscillator 186 are transported through divider 200 to counter 202, then moved by driver 204 through switch 198 to display 22d, where either length measurement or time appears, depending on the position of switch 198.

The embodiment of FIG. 17 is combination length-time-calculator device 206, wherein photointerrupter-sensor 18d reads scale markings 14f of filament 12f, sending pulse signals to pulse distributor 208; at the same time, clock oscillator 186a sends signals through divider 200a into pulse distributor 208 also. The signals generated from the movement of filament 12f are directed on through English-metric scale converter 210 to calculator 50a, for the adjusted total measurement reading to appear on display 22e, while simultaneously, clock pulse issues from pulse distributor 208 and enters calculator 50a to be shown as time on its own display 22f.

In FIGS. 18 and 19, an optically controlled switching device 212 is illustrated. This embodiment includes storage reel 126d carrying filament 12g and its scale markings 14g to be led past photointerrupter-sensor 18e. Reel 126d is mounted on, and to rotate with, shaft 170a, which also carries reel gear 172a as well as switch arm 214 and coil spring 216. Gear 172a cooperates with meshing gear 218 on shaft 220, so that when filament 12g is unwound from reel 126d, coil spring 184a, fixed at one end on shaft 220 and at the other end by housing 222, is tightened. During this action, switch arm 214 is urged in the clockwise direction against stop pin 224, as seen in FIG. 19. Arm 214 has a light-reflecting surface 226 facing switch detector 228, which controls the direction of counting of any electronic counter or calculator device previously described.

With arm 214 in the solid position shown in FIG. 19, the counting direction is positive; on release of filament 12g, spring 184a turns reel 126d counterclockwise, rewinding the filament and carrying switch arm 214 to its dot-dash position against stop pin 230, in which attitude light-reflecting surface 226 no longer faces switch detector 228, and the counting direction is reversed until filament 12g is competely rewound. At this point, with reel 126d at rest, spring 216 causes arm 214 to return to its starting position against stop pin 224, so that switch detector 228 and cooperating light-reflective surface 226 are again aligned and the counting direction restored to "up".

Another switching mechanism, 232, this one electrical, is detailed in FIG. 20, which shows a portion of movable switch arm 214a carrying switch contact plate 234 thereon and may be shifted reciprocally in the manner of arm 214 and its surface 226 in FIGS. 18, 19. Fixed brush contacts 236, 238 and 240 are held against the surface of arm 214a which, in the position of FIG. 20, places contact plate 234 so that the up-counting electrical circuit of the impulse counter is closed through contacts 236 and 238, as shown, and positive counting occurs, corresponding to the filament being withdrawn. The reverse occurs when arm 214a is shifted to the position where plate 234 connects contacts 238 and 240, thereby closing the down-counting circuit of the impulse counter (not shown) as the filament is rewound.

In like manner, switch cam 242 shown in FIG. 21 is either a part of, or is mounted on, a switch arm similar to arm 214 in FIGS. 18, 19, and may be shifted reciprocally in the unwinding and rewinding action of the measuring device. Here, switch cam 242 holds electric switch mechanism 244 in closed position for up-counting, as shown; the shifting of cam 242 so that one of its sloping surfaces 246,248 is positioned over switch mechanism 244, permitting it to open and thus reverse counting direction.

FIG. 22 illustrates a light-transfer system for use in both a light-actuated counter-directing switch as well as in measuring-pulse generation of a measuring device, wherein light source 16d, which may be an infra-red emitter, sends its rays through fiber optic bundle 250 and its branches 252 and 254. Branch 252 projects a light beam across the path of filament 12h so that scale markings 14h in passing may cause sensor 18f to generate pulse signals. Branch 254 impinges its beam on an optical switch arm 214b, which reflects the light to switch detector 228a in the up-counting mode. Movement of arm 214b, in a manner analogous to the movement of arm 214 in FIGS. 18, 19, eliminates the reflection of the light beam, thus switching the mechanism into down-counting mode until reflecting switch arm 214b returns to its starting position.

All measuring devices heretofore described have the capacity to measure length, or length plus time to determine velocity, with and without calculator functions. The additive devices of FIGS. 23-26 introduce the possibility for using these devices to make various other physical measurements. Thus, for example, bellows 256 in FIG. 23 is anchored to surface 258 at its bottom where fluid access opening 260 is located. Fastened to the top of bellows 256 is filament 12i, which, in this case, is preferably somewhat more rigid than the flexible filaments 12-12h described above but otherwise of identical character and having light-distinguishable scale markings 14i thereon. The vertical movement of filament 12i is caused by the change of fluid pressure entering opening 260, expanding or contracting bellows 256. This movement may be monitored, and the scale markings 14i read, by a photosensor-pulse generator (not shown) and the magnitude of the movement delivered to the display of an impulse counter or calculator, as described above. Using this combination of bellows and measuring device, those physical measurements dependent on fluid pressure may be read directly and accurately, with no intervening accuracy-reducing mechanical linkages, from gauges for pressure, temperature, air speed, fuel reserves, as well as altitude meters, climb and dive indicators and the like.

Similarly to the action of bellows 256, diaphragm 262 in FIG. 24 moves filament 12j proportionally to the fluid pressure exerted against it; and in FIG. 25, bladder 264 performs in exactly the same way in moving filament 12k in proportion to the ambient pressure.

FIG. 26 illustrates weighing scale 266 to be used in combination with the light-pulse-detecting, counting and displaying apparatus of the above-described measuring instruments, wherein filament 12m is suspended from extension 268 and is connected at its lower end to weighing pan 270. The movement of filament 12m past a light-sensing device (not shown) is created by the stretching of spring 268 in response to, and directly proportional to, the weight of an object placed on pan 270. Weighing scale 266 is most useful for the accurate weighing of small objects, particularly such jewelry items as pieces of gold and gemstones.

The measuring device 272, diagrammatically shown in FIG. 27, is a multi-function unit combining conventional calculator capability with capacity for making and displaying measurements of length, time, weight, velocity and fluid-pressure-controlled physical factors. In device 272, length-generated pulses are fed into rule counter 274, weight-generated pulses into weight counter 276, timing pulses into timer 278, and pressure-generated pulses from analog sensor 280 into analog-to-digital converter 282. Any function input desired may be fed from auxiliary keyboard 286 through programmable counter 284 into the appropriate counter 274, 276, timer 278, converter 282, or into multiplexer 288, which also receives signals from each of the units 274, 276, 278 2nd 282. Multiplexer 268 sends its signals through 4-to-16 recorder 290, then through I/O interface 292 to conventional calculator keyboard 294 for the adjusted physical measurement being taken to appear in appropriate units on digital display 296.

The operation of any of the measuring devices described above is dependent on the memory chip functions of the electronic impulse counters or calculators used, for their convenience and adaptability in taking and displaying measurements in the practice of this invention. The memory capacity of these units permits a variety of conversion constants and arithmetical factors to be stored therein and to be used selectively to: (a) adjust a directly-read value from the filament scale marking to appear in the appropriate units of the measurement taken; (b) take more than one measurement and combine them arithmetically to display velocity (length and time) or the area or volume represented by the measurements taken; (c) record a series of measurements consecutively without pause for later retrieval. Thus, a wallpaper or rug estimator, or a tailor fitting a garment, may take multiple measurements without having to stop to write each dimension down as it is taken.

Although what are believed to be the most practical and preferred embodiments have been described, it is apparent that departures from, and modifications of, these examples will suggest themselves to those skilled in the art and may be made without departing from the spirit and scope of the invention, which are limited only by the ensuing claims.

What is claimed is:

1. Apparatus for taking and displaying photoelectrically generated physical measurements, which comprises:
    movable filament means carrying a single set of light-distinguishable scale markings at pre-selected uniform intervals along its length, said filament means being composed of a homogeneous thin thread-like elongate flexible member, the extent of movement of said filament means being proportional to the magnitude of the physical measurements being taken;
    single photoelectric sensor means for cooperating with said scale markings, said sensor means directly receiving light pulses generated from, and corresponding to, the movement of said scale markings with said filament means when said filament means is moved into operative proximity to, and past, said single sensor means, producing a single electrical pulse for each of said passing scale markings and each of said light pulses generated therefrom;
    electronic processing means for receiving, counting, converting and registering said electrical pulses from said single sensor means and forwarding the resultant signals; and
    display means for receiving said resultant signals and for displaying the corresponding magnitude of the physical measurement being taken.

2. Apparatus for physical measurements in accordance with claim 1, wherein said movable filament means is nylon thread and said scale markings having light-absorbing characteristcs opposed to and distinguishable by said sensor means from the light-absorbing characteristics of said filament means.

3. Apparatus for physical measurements in accordance with claim 1, further comprising means for moving said filament means in operative proximity to, and past, said sensor means, said moving means being responsive to, and controlled by, the magnitude of the physical measurement being taken.

4. Apparatus for physical measurements in accordance with claim 3, wherein said means for moving said filament means is a device responsive to the fluid pressure produced by the force being measured.

5. Apparatus for physical measurements in accordance with claim 3, wherein said means for moving said filament means is a weighing scale extension spring stretchingly responsive to the object being weighed.

6. Apparatus for physical measurements in accordance with claim 1, wherein said electronic processing means comprises a counter having at least one memory chip.

7. Apparatus for physical measurements in accordance with claim 1, wherein said electronic processing means comprises a calculator having at least one memory chip.

8. Apparatus for taking and displaying photoelectrically generated length measurements, which comprises:
    movable filament means carrying a single set of light-distinguishable scale markings at pre-selected uniform intervals along its length, said filament means being composed of a homogeneous thin thread-like elongate flexible member;
    storage means for holding said filament means so that said filament means may be unwound therefrom and rewound thereon;
    single photoelectric sensor means for cooperating with said scale markings, said sensor means directly receiving light pulses generated by, and corresponding to, the movement of said scale markings with said filament means when said filament means is moved into operative proximity to, and past, said sensor means, thus producing a single electrical pulse for each of said passing scale markings;
    electronic processing means for receiving, counting, converting and registering said electrical pulses from said single sensor means and for forwarding the resultant signals; and
    display means for receiving said resultant signals and for displaying the corresponding magnitude of length measurement being taken.

9. Apparatus for length measurement in accordance with claim 8, further comprising means for returning said filament means to said storage means.

10. Apparatus for length measurements in accordance with claim 9, wherein said returning means comprises:
    motor means for rewinding said filament means on said storage means; and
    switching means for actuating said motor means and for reversing the counting of said electronic processing means.

11. Apparatus for length measurements in accordance with claim 9, wherein said returning means comprises a gear reduction drive for rewinding relatively large lengths of said filament means with relatively few turns of said storage means.

12. Apparatus for length measurements in accordance with claim 8, further comprising a housing having an extension of small cross-section for reaching into hard-to-reach places and allowing measurements to be taken therefrom.

13. Apparatus for length measurements in accordance with claim 8, wherein said storage means and said filament means are removable and replaceable.

14. Apparatus for length measurements in accordance with claim 8, further comprising temporary fastening means affixed to the free end of said filament means for attachment to the starting point of a measurement being taken.

15. Apparatus for length measurement in accordance with claim 8, further comprising an element to be attached to the free end of said filament means, said attached element being a weight.

16. Apparatus for length measurements in accordance with claim 8, further comprising means for cutting off said filament means after a measurement has been taken, in place of rewinding said filament means.

17. Apparatus for taking and displaying photoelectrically generated physical measurements, which comprises:
    a movable filament carrying a single set of scale markings at pre-selected uniform intervals along the length of said filament, said scale markings having light-absorbing characteristics contrasting with, and distinguishable from, the light-absorbing characteristics of said filament, said filament being a homogeneous thread-like elongate flexible member;

storage means for holding said filament;

means for moving said filament;

a light source;

single photoelectric sensor means for cooperating with said scale markings, said single sensor means being positioned in operatively spaced alignment with said light source, the path of movement of said movable filament being therebetween, said single sensor means being capable of detecting light pulses generated from and corresponding to the movement of said scale markings when said filament is moved, said single sensor means producing therefrom a single electrical pulse corresponding to each of said scale markings;

electronic calculator means for receiving, counting, registering, calculating and converting said electrical pulses received from said single sensor means and for forwarding the resulting signals, said calculator means having at least one memory chip;

timing mechanism operatively connected to, and supplying timing pulses for, said calculator means; and display means for receiving said resulting signals and said timing pulses from said calculator means, said resulting signals and said timing pulses producing the display on said display means of the magnitude of the physical measurement taken, the time elapsed and combinations thereof so that length, time and velocity may be indicated on said display means.

18. Apparatus for physical measurements in accordance with claim 17, wherein said light source and said photoelectric sensor are combined in the form of an infra-red emitter-detector.

19. Apparatus for physical measurements in accordance with claim 17, wherein said means for moving said filament comprises a fluid-pressure-responsive member attached to the free end of said movable filament, said member being capable of moving said movable filament and said scale markings thereon past said single sensor means proportionately in response to fluid pressure changes applied thereto, thus to generate pulses to be transmitted to said calculator means, whereby changes and rates of change of such physical characteristics as pressure, altitude and temperature may be selectively measured and displayed on said display means.

20. Apparatus for length measurement in accordance with claim 8, further comprising a projectile to be attached to the free end of said filament means.

21. Apparatus for length measurement in accordance with claim 8, further comprising a balloon to be attached to the free end of said filament means.

22. Apparatus for physical measurements in accordance with claim 17, further comprising a float to be attached to the free end of said filament.

* * * * *